United States Patent
Wang et al.

(10) Patent No.: US 9,225,484 B2
(45) Date of Patent: Dec. 29, 2015

(54) INTERFERENCE COORDINATING METHOD, BASE STATION AND USER EQUIPMENT

(71) Applicant: FUJITSU LIMITED, Kawasaki-shi, Kanagawa (JP)

(72) Inventors: Yi Wang, Beijing (CN); Timothy J. Moulsley, Caterham (GB); Yi Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 14/022,841

(22) Filed: Sep. 10, 2013

(65) Prior Publication Data

US 2014/0010197 A1 Jan. 9, 2014

Related U.S. Application Data

(63) Continuation of application No. PCT/CN2011/071677, filed on Mar. 10, 2011.

(51) Int. Cl.
*H04L 1/00* (2006.01)
*H04L 5/00* (2006.01)
*H04J 11/00* (2006.01)
(Continued)

(52) U.S. Cl.
CPC ............ *H04L 5/0032* (2013.01); *H04B 7/0456* (2013.01); *H04B 7/0617* (2013.01); *H04J 11/0033* (2013.01); *H04J 11/0056* (2013.01); *H04L 25/03904* (2013.01);
(Continued)

(58) Field of Classification Search
CPC ..... H04L 5/0048; H04L 5/035; H04L 5/0091; H04B 7/024; H04W 52/325; H04W 52/40

USPC ......... 370/256, 280, 345, 344, 526, 329, 341; 455/422.1, 517, 452.1
See application file for complete search history.

(56) References Cited

U.S. PATENT DOCUMENTS

2009/0286482 A1   11/2009   Gorokhov et al.
2011/0098054 A1*   4/2011   Gorokhov et al. ......... 455/452.1

FOREIGN PATENT DOCUMENTS

CN   101662320       3/2010
CN   101662320 A     3/2010
(Continued)

OTHER PUBLICATIONS

Notice of Preliminary Rejection issued for corresponding Korean Patent Application No. 10-2013-7026025, mailed on Nov. 20, 2014, with English translation.
(Continued)

*Primary Examiner* — Dady Chery
(74) *Attorney, Agent, or Firm* — Myers Wolin, LLC

(57) ABSTRACT

A method of interference coordination, base station and user equipment. The method comprises: precoding by a macro cell eNB the signals of the downlink control channel of scheduled macro cell UE by using pre-obtained precoded matrixes, such that the signal null space formed by precoding is pointed to pico cells and/or the characteristic value space of the signals is pointed to the macro cell UE. With such a method, almost all the interference caused by the PDCCH of the macro cell to the pico cell is eliminated, and the performances of the macro cell are not affected, solving the problem existed in the prior art; or improving the receiving performance of the macro cell UE, and further alleviating the interference of the macro cell on the pico cells.

15 Claims, 6 Drawing Sheets

(51) Int. Cl.
  *H04L 25/03* (2006.01)
  *H04W 52/02* (2009.01)
  *H04B 7/06* (2006.01)
  *H04B 7/04* (2006.01)
  *H04W 24/02* (2009.01)

(52) U.S. Cl.
  CPC ........ H04W 52/0216 (2013.01); *H04B 7/0413* (2013.01); *H04W 24/02* (2013.01)

(56) References Cited

FOREIGN PATENT DOCUMENTS

| | | |
|---|---|---|
| CN | 101908948 | 12/2010 |
| EP | 2663116 A1 | 11/2013 |
| JP | 2012-147125 A | 8/2012 |
| WO | 2010/019015 | 2/2010 |

OTHER PUBLICATIONS

Second Office Action issued for corresponding Chinese Patent Application No. 201180069022.8 dated Jan. 6, 2015 with an English translation.

Search report issued for corresponding Chinese Patent Application No. 201180069022.8 dated Dec. 24, 2014 with an English translation.

First Notification of Office Action issued by State Intellectual Property Office of China, for corresponding Chinese Patent Application 201180069022.8 dated Jul. 3, 2014. English Translation of the Office Action.

Extended European Search Report issued for corresponding European Patent Application No. 11860151.7, mailed Jul. 28, 2014.

Supplementary European Search Report issued for corresponding European Patent Application No. 11860151.7, mailed Aug. 14, 2014.

Qualcomm Europe, "Signaling for spatial coordination in DL CoMP", Agenda Item 15.2, Aug. 24-28, 2009, 3GPP TSG-RAN WG1 #58, R1-093141, Shenzhen, China.

Catt et al., "DL Interference Mitigation via Direction in Het-Net", Agenda Item 6.8.2, Jun. 28-Jul. 2, 2010, 3GPP TSG-RAN WG1 #61bis, R1-103497, Dresden, Germany.

Non-final Notice of Reasons for Rejection issued for corresponding Japanese Patent Application No. 2013-556945, mailed on Dec. 9, 2014, with an English translation.

International search report issued for corresponding International Patent Application No. PCT/CN2011/071677, mailed Dec. 22, 2011, with English translation.

Viveck R. Cadambe et al., "Interference Alignment and Spatial Degrees of Freedom for the K User Interference Channel", IEEE Transaction Information Theory, vol. 54, issue 8, Aug. 2008, pp. 3425-3441.

* cited by examiner

INTERFERENCE COORDINATING METHOD, BASE STATION AND USER EQUIPMENT

CROSS-REFERENCE TO RELATED APPLICATIONS

This application is a continuation of International Application PCT/CN2011/071677, filed Mar. 10, 2011 and designating the U.S., the entire contents of which are incorporated herein by reference.

TECHNICAL FIELD

The present invention relates to the field of wireless communications, and in particular to a method of interference coordination, base station and user equipment.

BACKGROUND ART

A long-term evolution-advanced (LTE-A) heterogeneous network system consists of a macro cell, a femto cell, a pico cell, a remote radio head (RRH) and a relay. Although the capacity of system may be improved, better services may be provided to users in special areas and performances of the system may be optimized by deploying new wireless nodes (such as a home eNodeB, a pico eNodeB, and an RRH), the newly-deployed nodes will bring interference to the users of the originally deployed cell, even resulting in certain coverage holes.

FIG. 1 is a schematic diagram of a heterogeneous network system. As shown in FIG. 1, in a typical macro cell plus pico cell heterogeneous network, the user equipment (UE) at an edge B of the pico cell receiving services the pico cell is subject to the interference of the downlink signals from a macro cell A, as indicated by the dotted lines in FIG. 1.

Currently, in an LTE-A heterogeneous network, a physical downlink control channel (PDCCH) is transmitted in a broadcasting manner, so that the interference to the pico cell caused by the PDCCH of the macro cell is undirectional. Therefore, in order to solve the problem of downlink interference in a heterogeneous network, a solution of almost blank subframe (ABS) is employed in an LTE-A heterogeneous network. Wherein some of the subframes in the macro cell are selected as ABSs, in which no control signaling used for scheduling any UE to transmit data is transmitted, and no data corresponding to any UE is transmitted. At a temporal location corresponding to the ABSs, the pico cell may transmit control signaling used for scheduling data of UE in the pico cell, and corresponding data, thereby suppressing interference from the macro cell.

However, in the implementation of the present invention, the inventors found that following defect exists in the prior art: when ABS is adopted for interference coordination, the throughput of the macro cell will be lowered, and the resources cannot be utilized efficiently. No method in prior art can solve the above problem.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a method of interference coordination, base station and user equipment. With such a method, almost all the interferences to the pico cell caused by the PDCCH of the macro cell are eliminated, and the performances of the macro cell are not affected, solving the problem existed in the prior art.

According to one aspect of the embodiments of the present invention, there is provided a method of interference coordination, comprising: precoding by a macro base station the signals of the downlink control channel of scheduled macro cell UE by using pre-obtained precoded matrixes, such that the signal null space formed by precoding is pointed to pico cells and/or the intensive power direction/characteristic value space of the signals is pointed to the macro cell UE.

According to another aspect of the embodiments of the present invention, there is provided a method of interference coordination, comprising:

detecting by macro cell UE the signals of a downlink control channel, the signals of the downlink control channel being precoded by a Macro base station, such that the signal null space formed by precoding is pointed to pico cells and/or the intensive power direction/characteristic value space of the signals are pointed to the macro cell UE; and decoding the signals by the macro cell UE according to a result of channel estimation or according to pre-obtained related information including precoded matrixes.

According to a further aspect of the embodiments of the present invention, there is provided a Macro base station, comprising:

a first signal processing unit to precode the signals of the downlink control channel of scheduled macro cell UE by using pre-obtained precoded matrixes; and an antenna unit to transmit signals being precoded, such that the signal null space formed by precoding is pointed to pico cells and/or the intensive power direction/characteristic value space of the signals are pointed to the macro cell UE.

According to still another aspect of the embodiments of the present invention, there is provided user equipment, comprising:

a signal detecting unit to detect the signals of a downlink control channel, the signals of the downlink control channel being precoded by a Macro base station, such that the signal null space formed by precoding is pointed to pico cells and/or the intensive power direction/characteristic value space of the signals are pointed to the macro cell UE; and a second signal processing unit to decode the signals detected by the signal detecting unit according to a result of channel estimation or according to pre-obtained related information including precoded matrixes.

According to still another aspect of the embodiments of the present invention, there is provided a computer-readable program, wherein when the program is executed in a Macro base station, the program enables the computer to carry out the method of interference coordination as described above in the Macro base station.

According to still another aspect of the embodiments of the present invention, there is provided a storage medium in which a computer-readable program is stored, wherein the computer-readable program enables the computer to carry out the method of interference coordination as described above in a Macro base station.

According to still another aspect of the embodiments of the present invention, there is provided a computer-readable program, wherein when the program is executed in user equipment, the program enables the computer to carry out the method of interference coordination as described above in the user equipment.

According to still another aspect of the embodiments of the present invention, there is provided a storage medium in which a computer-readable program is stored, wherein the computer-readable program enables the computer to carry out the method of interference coordination as described above in user equipment.

The advantages of the present invention exit in: by precoding the signals of the downlink control channel, the signal null space formed by precoding is pointed to pico cells, thereby eliminating almost all the interferences caused by the PDCCH of the macro cell to the pico cell, and the performances of the macro cell being not affected, solving the problem existed in the prior art; furthermore, by making the intensive power direction/characteristic value space of the signals to be pointed to the macro cell UE, the receiving performance of the macro cell UE may be further improved, and the interference of the macro cell on the pico cell may further be alleviated.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the embodiments of the present invention will be well understood with reference to the following accompanying drawings, in which.

DETAILED DESCRIPTION OF THE INVENTION

Figure 1:
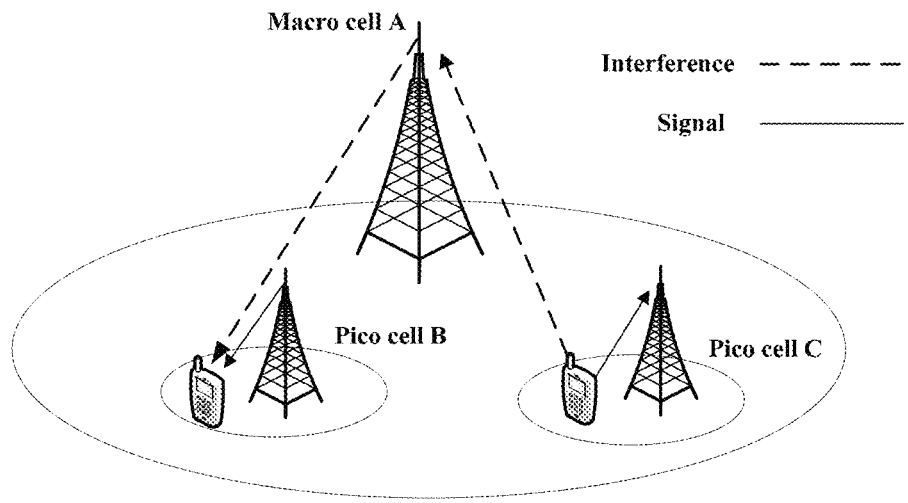
FIG. 1 is a schematic diagram of a typical heterogeneous network system.

The foregoing and other features of the embodiments of the present invention will become apparent with reference to the drawings and the following description. These embodiments are illustrative only and are not intended to limit the present invention. For easy understanding of the principle and embodiments of the present invention by those skilled in the art, the embodiments of the present invention are described taking interference coordination in a long-term evolution advanced (LTE-A) heterogeneous network system as an example. However, it should be understood that the present invention is not limited to the above system and is applicable to other systems related to interference coordination between cells.

Embodiment 1

An embodiment of the present invention provides a method of interference coordination, comprising: precoding by a macro cell eNB the signals of the downlink control channel of scheduled macro cell UE by using pre-obtained precoded matrixes, such that the signal null space formed by precoding is pointed to pico cells and/or the intensive power direction/characteristic value space of the signals is pointed to the macro cell UE.

In this embodiment, the signals of the PDCCH may be precoded, such that the signal null space formed by precoding is pointed to pico cells, or the intensive power direction, such as a characteristic value space, of the signals, is pointed to the macro cell UE.

Furthermore, the signals of the PDCCH may be precoded, such that the signal null space formed by precoding is pointed to pico cells, and a characteristic value space of the signals is pointed to the macro cell UE. Different manners of interference coordination may be employed as actually required.

Currently, as PDCCH is transmitted in a broadcasting manner, the interference to the pico cell caused by the PDCCH of the macro cell is undirectional. In order to eliminate the downlink interference, in the embodiment of the present invention, the signals of the PDCCH is precoded, such that the signal null space formed by precoding is pointed to the pico cells, thereby eliminating almost all the interferences to the pico cell caused by the PDCCH of the macro cell, and the performances of the macro cell being not affected, solving the problem existed in the prior art. Furthermore, with above precoding procedure, by making the intensive power direction, such as a characteristic value space, of the signals, to be pointed to the macro cell UE, the receiving performance of the macro cell UE may be further improved, and the interference of the macro cell on the pico cell may further be alleviated. In this embodiment, when the macro cell eNB precodes the signals of the downlink control channel of scheduled macro cell UE by using pre-obtained precoded matrixes, the macro cell eNB may multiply the signals of the downlink control channel with the precoded matrixes, such that the signal null space formed by precoding is pointed to the pico cells and/or the intensive power direction/characteristic value space of the signals is pointed to the macro cell UE.

In this embodiment, any precoding method similar to the prior art may be used to process the signals of the PDCCH, such that the signal null space is pointed to the pico cells and/or the characteristic value space of the signals is pointed to the macro cell UE.

And such a manner may also be used to generate the precoded matrixes that the macro cell eNB generates the precoded matrixes according to the channel information of the pico cells or according to the channel information of the pico cells and the channel information of the macro cell UE. Wherein, location information or phase information contained in the channel information may be used to generate the precoded matrixes. Different generation method may be used for different deployment of antennas. Following description is given by way of examples.

EXAMPLE 1

The macro cell eNB generates the precoded matrixes used for precoding the PDCCHs of the macro cell at the macro cell side based on information on the channel from a pico cell to the macro cell eNB, or based on the information on the channel from the pico cell to the macro cell eNB and information on the channel from macro cell UE to the macro cell eNB. Wherein, the needed channel information may be obtained based on direction location information of the pico cell relative to the macro cell eNB, or possibly further based on direction location information of the macro cell UE relative to the macro cell eNB, or also based on the channel information measured and fed back by the macro cell UE to the macro cell eNB.

EXAMPLE 2

For the case of an antenna array, the macro cell eNB may obtain the amplitude and phase of each array element based on a certain rule according to the locations of the pico cells or according to the locations of the pico cells and the location of the macro cell eNB, and generates the beamformed array elements (corresponding to the precoded matrixes), such that "a null point" (also referred to as "a null limit") containing null radiation power is pointed to the pico cells, and at the same time, the lobes in the direction of the maximum radiation power are pointed to the macro cell UE. And for such a case of an antenna array, it belongs to a manner of precoding, with a null point formed by it, i.e. a nulling space, being pointed to the pico cells. Therefore, the null space of the beam formed by the antennas is pointed to the pico cells, so as to eliminate the interference caused by the PDCCH of the macro cell to the pico cell, at the same time, the direction of the lobes with intensive power is made to be pointed to the macro cell UE through above precoding procedure. In this way, not only the interference to the pico cell caused by the macro cell is eliminated, but also the receiving performance of the macro cell UE is improved.

Wherein, the antenna array may generate a plurality of "null points" at the same time; for example, for an antenna array with M elements, "null points" may be formed in M-2 directions, that is, interference on M-2 pico cells may be avoided at the same time, wherein, M is a natural number. In an actual system, there may be a small amount of power leakage at the null point positions, which results in that the interference caused by the macro cell to the pico cells still exists. However, the interference is low and is acceptable.

EXAMPLE 3

For antenna configuration of weak correlation, such as a polarization antenna, a corresponding precoded matrix may be selected by using the information on the channel between a macro cell user and the macro cell eNB and the information on the relative positions of the macro cell and the pico cells which is fed back by the macro cell UE, so that the precoded matrix is orthogonal to the channel from the macro cell to pico cell UE and matched with the channel from the macro cell eNB to the macro cell UE at the same time.

The above method for generating a precoded matrix is an embodiment only. Besides above method, other methods may also be used, which shall not be described any further. In general, after precoding the PDCCH by using the precoded matrix, the null space of the signals formed by precoding is pointed to the pico cells, thereby eliminating the interference caused by the macro cell to the pico cells, and the method brings no affection to the performance of the macro cell. Furthermore, the intensive power direction of the signals are made to be pointed to the macro cell UE, thereby not only eliminating the interference caused by the macro cell to the pico cells, but also improving the receiving performance of the macro cell UE.

In the embodiment of the present invention, after generating the above precoded matrix, the macro cell eNB may store the matrix element information of the precoded matrix; wherein the UE may generate a corresponding matrix by using the matrix element information. The matrix element information may comprise values of each of the elements in the matrix, and may also comprise certain information; for example, for an antenna array, it may contain phase information θ only, so as to derive numerical values f(θ) of all the elements in the matrix.

Or, in this embodiment, the matrix elements in the precoded matrix may be stored correspondingly with matrix indices, so as to find out the matrix elements in the precoded matrix through the matrix indices, thereby obtaining the precoded matrix.

In this embodiment, the method may further comprise: configuring sub-frame information indicative of whether to precode the macro cell UE, such that the signal null space formed by precoding is pointed to pico cells, and/or the intensive power direction/characteristic value space of the signals are pointed to the macro cell UE. Furthermore, the method may comprise: storing the above information.

Wherein, bit values may be used for indication. For example, for subframes 1-10, bit numbers of each of the subframes may be configured. And wherein, if a bit value to which a certain subframe corresponds is "1", it indicates that a generated precoded matrix is used to precode signals of a downlink control channel, such that the signal null space formed by precoding is pointed to pico cells and/or the intensive power direction/characteristic value space of the signals is pointed to the macro cell UE; and if a bit value to which a certain subframe corresponds is "0", it indicates that a generated precoded matrix is not used to precode signals of a downlink control channel, and other multi-antenna processing manner configured by the system, such as transmit diversity, is used for precoding. Table 1 shows a mapping relation between subframes and bit values (subframe information).

TABLE 1

| | Subframe number | | | | | | | | | |
|---|---|---|---|---|---|---|---|---|---|---|
| | 1 | 2 | 3 | 4 | 5 | 6 | 7 | 8 | 9 | 10 |
| Bit value to which a subframe corresponds | 0 | 0 | 0 | 0 | 0 | 0 | 0 | 0 | 0 | 1 |

After the subframe information shown in Table 1 is configured, and before the macro cell eNB precodes the signals of the downlink control channel of the scheduled macro cell UE, the method may further comprise:

determining according to the sub-frame information whether the current sub-frame is the sub-frame that obtained by precoding the signals of the downlink control channel, such that the signal null space formed by precoding is pointed to pico cells and/or the intensive power direction/characteristic value space of the signals are pointed to the macro cell UE; and determining by the macro cell eNB, if the result of determining is positive, to precode the signals of the downlink control channel of the scheduled macro cell UE, such that the signal null space formed by precoding is pointed to the pico cells and/or the intensive power direction/characteristic value space of the signals are pointed to the macro cell UE.

In this embodiment, the macro cell eNB may generate the precoded matrix as actually required, and in generating the precoded matrix, at least one of the precoded matrix of macro cell UE is different from the precoded matrixes of other macro cell UE.

TABLE 2

| UE | 1 | 2 | 3 | 4 | 5 |
|---|---|---|---|---|---|
| Matrix indices | 1 | 5 | 8 | 2 | 1 |

As shown in Table 2, the precoded matrixes of UE1 and UE5 generated by the macro cell eNB are identical, and the precoded matrixes of other UE are different; wherein the precoded matrixes are denoted by matrix indices, and matrix element information of the precoded matrixes to which the matrix indices correspond are stored at the eNB side or the UE side.

In this embodiment, for the same macro cell UE, different precoded matrixes are corresponded in different cases, such as at different locations or different subframes, different precoded matrixes are used for different subframes to which the same UE corresponds.

In this embodiment, at least one of the precoded matrix corresponding to a subframe is different from the precoded matrixes to which other subframes correspond, as shown in Table 3.

TABLE 3

| | Subframe number | | | | | | | | | |
|---|---|---|---|---|---|---|---|---|---|---|
| | 1 | 2 | 3 | 4 | 5 | 6 | 7 | 8 | 9 | 10 |
| Matrix indices | 1 | 1 | 1 | 1 | 5 | 1 | 1 | 1 | 1 | 5 |

As shown in Table 3, for the subframes with subframe numbers 5 and 10, the matrix indices of the corresponding precoded matrixes are 5, and the indices of precoded matrixes to which the rest of the subframes correspond are 1.

In this embodiment, different information is configured for different UE. For example, as the locations of each UE are different, at least one of the related information, i.e. subframe information, and information on precoded matrixes, etc., corresponding to a macro cell UE is different from the related information to which other UE corresponds, as shown in Tables 4-1 to 4-3.

TABLE 4-1

| | UE1 | | | | | | | | | |
|---|---|---|---|---|---|---|---|---|---|---|
| Bit value to which a subframe corresponds | 0 | 0 | 0 | 0 | 0 | 0 | 0 | 0 | 0 | 1 |
| Matrix indices | | | | | 5 | | | | | |

TABLE 4-2

| | UE2 | | | | | | | | | |
|---|---|---|---|---|---|---|---|---|---|---|
| Bit value to which a subframe corresponds | 0 | 0 | 0 | 0 | 1 | 0 | 0 | 0 | 0 | 0 |
| Matrix indices | | | | | 2 | | | | | |

TABLE 4-3

| | UE3 | | | | | | | | | |
|---|---|---|---|---|---|---|---|---|---|---|
| Bit value to which a subframe corresponds | 0 | 0 | 0 | 0 | 0 | 0 | 0 | 0 | 0 | 1 |
| Matrix indices | | | | | | | | | 8 | |

As shown in Table 4-1, for UE1, the subframe number is 10, and the index of the precoded matrix is 5, indicating that the signals of the PDCCH are precoded when the subframe number is 10, and the used matrix index is 5; as shown in Table 4-2, for UE2, the subframe number is 5, and the index of the precoded matrix is 2; and as shown in Table 4-3, for UE3, the subframe number is 10, and the index of the precoded matrix is 8.

In this embodiment, the macro cell eNB may further configure information related to the transmission power of the PDCCH as actually required, such as information on a power value of each step and a power adjustment step. For example, assuming that the power value to which each step corresponds is 2 dB, the information on the power adjustment step, i.e. the step index '3', denotes 6 dB; and such a parameter may also be a value of power adjustment.

Furthermore, it should be noted that the information configured by the macro cell eNB as actually required may contain all or only part of the above information, such as subframe information and the information related to the PDCCH transmission power; and may further contain other information as actually required, so as to ensure the receiving performance of the PDCCH.

In this embodiment, the macro cell eNB may further decide whether to inform the macro cell UE of the generated precoded matrixes, or the precoded matrixes and the above configured subframe information.

For example, for a PDCCH demodulated based on a demodulation reference signal (DM-RS), the macro cell eNB needs not to inform the macro cell UE of the related information containing some of the above information on precoded matrixes, subframes and PDCCH transmission power. And such information is only used at the macro cell UE side. In such a case, no matter whether the macro cell eNB precodes the signals of the PDCCH, the macro cell UE performs blind detection on the PDCCH, that is, performing multi-antenna decoding according to a result of channel estimation.

Besides the above case, the macro cell eNB may further inform the macro cell UE of the above related information. In such a case, when the macro cell eNB precodes the signals of the PDCCH, such that the signal null space of a beam formed by the antennas is pointed to pico cells and/or the directions of the lobes are pointed to the macro cell UE, and when the macro cell UE detects the signals of the PDCCH, the macro cell UE may decode the signals of the PDCCH according to the obtained related information.

In this embodiment, if it is needed to inform the macro cell UE of the above related information, the macro cell eNB may inform the macro cell UE of such related information as the generated precoded matrixes, or the configured subframe information respectively; furthermore, it may inform the macro cell UE of the above related information together via high-layer signaling, such as radio resource control (RRC) signaling, such that when the macro cell UE detects the signals of the PDCCH, the macro cell UE may correctly decode the signals of the PDCCH according to the obtained related information.

Following description is given taking that the macro cell eNB configures the related information via high-layer dynamic signaling and inform the UE.

Figure 2:
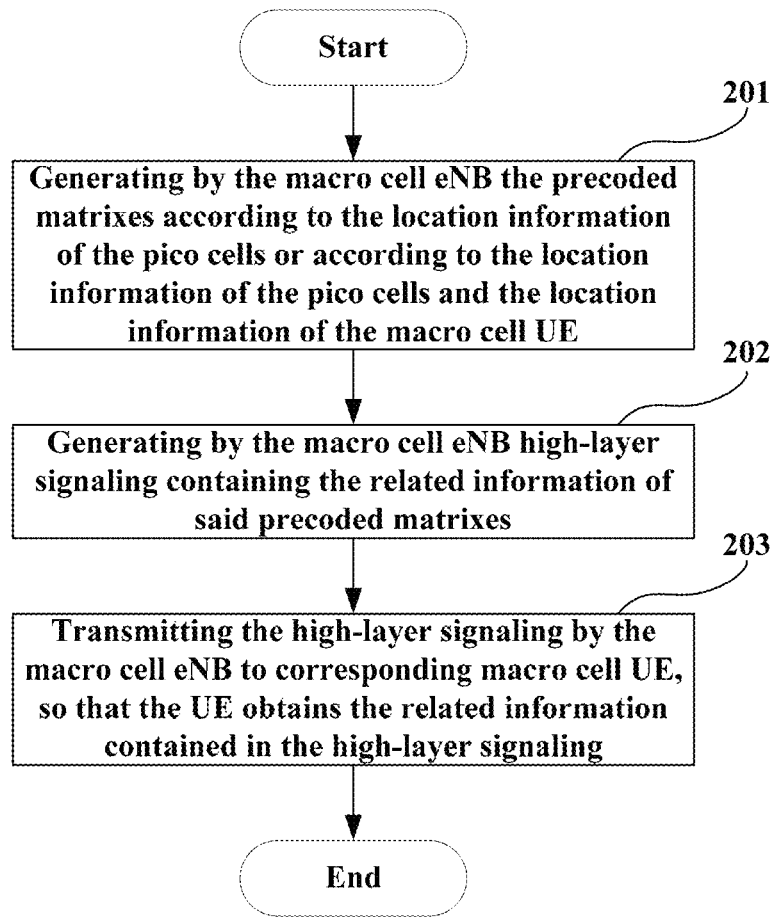
FIG. 2 is a flowchart of a method for configuring related information at a macro cell eNB side of embodiment 1 of the present invention.

FIG. 2 is a flowchart of a method for configuring related information by a macro cell eNB of embodiment 1 of the present invention. As shown in FIG. 2, the method comprises the steps of:

step 201: generating by the macro cell eNB the precoded matrixes according to the channel information of the pico cells or according to the channel information of the pico cells and the channel information of the macro cell UE;

wherein any manner similar to the prior art may be used for generating the precoded matrixes, and the above manner of the embodiment of the present invention may also be used, which shall not be described any further; and wherein the precoded matrixes may be generated according to the location information or phase information contained in the channel information;

step 202: generating by the macro cell eNB high-layer signaling containing at least the related information of said precoded matrixes;

wherein the high-layer signaling may be RRC signaling;

and beside the above information, the related information may further comprise PDCCH transmission power;

furthermore, subframe information may also be included, and the subframe information may indicate in which subframe the signals of the PDCCH are precoded, i.e. subframe information used to indicate whether the macro cell UE is precoded;

the above related information is as shown in Table 5; and it should noted that the macro cell eNB may contain all or only part of the related information as actually required, and may contain other information as actually required, so as to ensure the receiving performance of the PDCCH.

TABLE 5

| Related information | Precoded matrixes | PDCCH transmission power | Subframe information |
|---|---|---|---|
| Indication manner | Matrix index Matrix element information | Step index Power value | Bitmap indication Subframe index | step 203: transmitting the high-layer signaling by the macro cell eNB to corresponding macro cell UE, so that the UE obtains the related information contained in the high-layer signaling;

wherein the macro cell eNB may transmit the high-layer signaling to the macro cell UE via a PDSCH; however, it is not limited thereto, and other manners may be used to transmit the high-layer signaling.

In this embodiment, step 203 may be omitted, as described above.

In this embodiment, as shown in Table 5, the macro cell eNB may use different indication manners to indicate the above related information, which shall be described below with reference to Table 5.

EXAMPLE 1

For "precoded matrix matrixes", a matrix index manner may be used to indicate the "precoded matrix matrixes"; and if such an indication manner is used, a same one-to-one corresponding relation between matrix elements and the matrix indices needs to be stored at both the macro cell eNB side and the macro cell UE side, and the macro cell eNB informs the macro cell UE of the matrix indices.

EXAMPLE 2

Information on "precoded matrix matrixes" may also be matrix element information, and the matrix element information may be informed to corresponding macro cell UE, such that the UE may generate corresponding matrixes by using the matrix element information.

Wherein the matrix element information may contain values of each element in the matrixes, and may contain only certain information; for example, for an antenna array, phase information θ may be contained, so as to derive numerical values f(θ) of all the elements in the matrixes.

EXAMPLE 3

Information on "PDCCH transmission power" may be information on power adjustment step; for example, if the power value to which each step corresponds is 2 dB, the step index '3' denotes 6 dB; and it may also be a value of power adjustment.

EXAMPLE 4

For "subframe information", a manner of bitmap between the subframes and the bit values may be used to indicate the subframes; for example, as shown in Table 1, there are total 10 bits, indicating corresponding to 10 subframes, such as subframes 1-10. If a bit value is 1, it denotes that the corresponding subframe decodes the signals of the PDCCH according to "the precoded matrixes", and in this embodiment, the subframe is number 10 subframe; and if a bit value is 0, it denotes that the processing of the signals of the PDCCH in the corresponding subframe is not based on the high-layer signaling, but based on a transmission manner PDCCH generally configured for the cells. Taking an LTE system as an example, the PDCCHs of these subframes do not perform precoding, but use transmit diversity.

It can be seen from the above embodiment that the macro cell eNB may configure the related information needed by the macro cell eNB in precoding, via high-layer signaling, such as RRC signaling, the related information comprising precoded matrix matrixes, and it can be determined whether to inform the macro cell UE of the related information via the high-layer signaling as actually required. In this way, the macro cell eNB may precode the signals of the PDCCH of scheduled macro cell UE by using the related information, and for the case where the macro cell UE needs to use the related information, the related information may be used to correctly decode the precoded signals of the PDCCH.

Embodiment 2

The method of interference coordination of embodiment 2 of the present invention shall be described below with reference to the drawings. Wherein, the process of precoding the signals of the PDCCH shall be described in detail taking the related information configured by the macro cell eNB via high-layer signaling.

Figure 3:
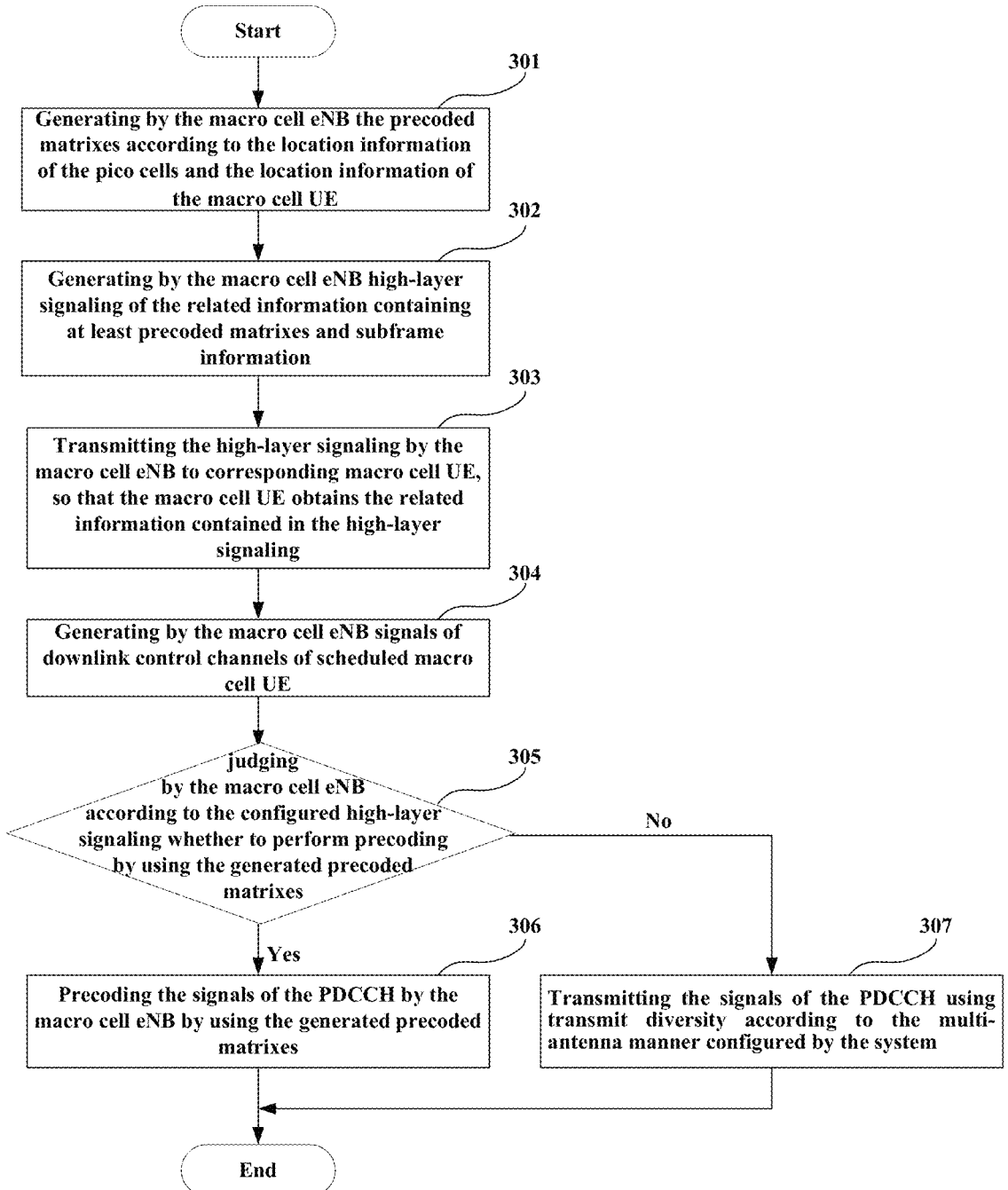
FIG. 3 is a flowchart of the method of interference coordination of embodiment 2 of the present invention.

FIG. 3 is a flowchart of the method of interference coordination of embodiment 2 of the present invention. As shown in FIG. 3, the method comprises:

step 301: generating by the macro cell eNB the precoded matrixes according to the channel information of the pico cells or according to the channel information of the pico cells and the channel information of the macro cell UE;

wherein the macro cell eNB generates the related information based on the location information of the pico cells and the location information of the macro cell UE, and the channel information may comprise location information or phase information, the method of generation being as described in Embodiment 1, which shall not described herein any further;

step 302: generating by the macro cell eNB high-layer signaling of the related information containing at least said precoded matrixes, so that the macro cell UE may correctly decodes a received PDCCH according to the related information;

besides the above information, the related information further comprises subframe information, the subframe information indicating in which of the subframes the signals of the PDCCH are precoded, that is, subframe information indicating whether to precode the macro cell UE;

for example, as shown in tables 4-1 to 4-3, for different UE, corresponding matrixes may be identical or different, and corresponding subframe information may be identical or different;

it should be noted that the macro cell eNB may further contain other information as actually required, so as to ensure the receiving performance of the PDCCH;

step 303: informing the high-layer signaling by the macro cell eNB to corresponding macro cell UE, so that the UE obtains the related information contained in the high-layer signaling;

for example, the informed information is as shown in Table 3, wherein the matrixes are indicated by the matrix indices; in this way, the pico cells are needed to inform a corresponding relation between the matrix elements and the matrix indices to the UE, and stores it at the macro cell eNB side and the macro cell UE side;

thus, the macro cell eNB may perform multi-antenna processing on the signals of the PDCCH according to the above related information configured by the high-layer signaling;

step 304: generating by the macro cell eNB signals of downlink control channels of scheduled macro cell UE, when the macro cell eNB schedules multiple of macro cell UEs;

wherein the process of generation is similar to the prior art; and wherein the macro cell eNB may generate corresponding downlink control information (DCI) according to the transmission modes of each UE, and demodulate, encode, multiplex and scramble the DCI;

step 305: judging by the macro cell eNB according to the high-layer signaling configured in steps 301-302, whether to precode the signals of the downlink control channel of the scheduled macro cell UE, such that the signal null space formed by precoding is pointed to the pico cells and/or the intensive power direction or characteristic value space of the signals is pointed to the macro cell UE; and executing step 306 if the result of judgment is positive; otherwise, executing step 307;

wherein, the macro cell eNB may perform the judgment according to the configured subframe information in Table 3, comprising:

if it is determined according to the subframe information that the current subframe is a subframe precoding the signals of the PDCCH, the macro cell eNB determines to use the generated precoded matrixes to precode the signals of the downlink control channel of the scheduled UE, such that the signal null space formed by precoding is pointed to the pico cells and/or the intensive power direction/characteristic value space of the signals are pointed to the macro cell UE; otherwise, the precoding is not performed, and the multi-antenna manner configured by the system is used and the signals of the PDCCH are transmitted with transmit diversity;

wherein, as shown in Table 4-1, for macro cell UE1, if the current subframe is the subframe with number 5, it can be determined that the configured high-layer signaling is not used to process the signals of the PDCCH, and step 307 is executed; and if the number of the current subframe is 10, the configured high-layer signaling is used to process the signals of the PDCCH, and step 306 is executed;

likewise, as shown in tables 4-2 and 4-3, whether the configured high-layer signaling is used to process the signals of the PDCCH is judged according to the current subframe information, which shall not be described herein any further;

step 306: precoding the signals of the PDCCH by the macro cell eNB according to the generated precoded matrixes if the result of judgment in step 305 is positive, such that the signal null space formed by precoding is pointed to the pico cells and/or the intensive power direction or characteristic value space of the signals are pointed to the macro cell UE;

In the case where array antennas are used, the null space of the beam formed by the antennas is made to be pointed to the pico cells, and/or the direction of the lobes is made to be pointed to the macro cell UE;

wherein, as shown in Table 4-1, for the macro cell UE1, the matrixes are denoted by the matrix indices, such as matrix index 5; hence, the macro cell eNB may find out the corresponding matrix according to the matrix index 5 and process the signals of the PDCCH of the UE1, such that the signal null space formed by precoding is pointed to the pico cells and/or the intensive power direction or characteristic value space of the signals are pointed to the macro cell UE;

step 307: transmitting the signals of the PDCCH using transmit diversity according to the multi-antenna manner configured by the system if the result of judgment in step 305 is negative;

wherein, as shown in Table 4-1, for macro cell UE1, if the current subframe index is 5, the macro cell eNB transmits the signals of the PDCCH using transmit diversity according to the multi-antenna manner configured by the system.

In the above embodiment, description is given taking tables 4-1 to 4-3 as examples. In this way, step 305 for judgment needs to be executed before processing the signals of the PDCCH. And if the information configured by the macro cell eNB via high-layer signaling is about other cases, such as performing precoding on all the UE, steps 305 and 307 may be omitted. Above case is only an embodiment of the present invention.

It can be seen from the above embodiment that the macro cell eNB may configure the related information needed by the macro cell eNB in precoding, via high-layer signaling, such as RRC signaling, and inform the macro cell UE of the related information. In this way, the macro cell eNB may precode the signals of the PDCCH of scheduled macro cell UE by using the related information, such that the signal null space formed by precoding is pointed to the pico cells and/or the intensive power direction or characteristic value space of the signals are pointed to the macro cell UE, thereby eliminating the interference of the signals of the PDCCH of the macro cell eNB on the pico cells, avoiding lowering of the performance of the eNB, and solving the problem existed in the prior art; or not only improving the receiving performance of the macro cell UE, but also further eliminating interference of the macro cell on the pico cells.

Embodiment 3

Figure 4:
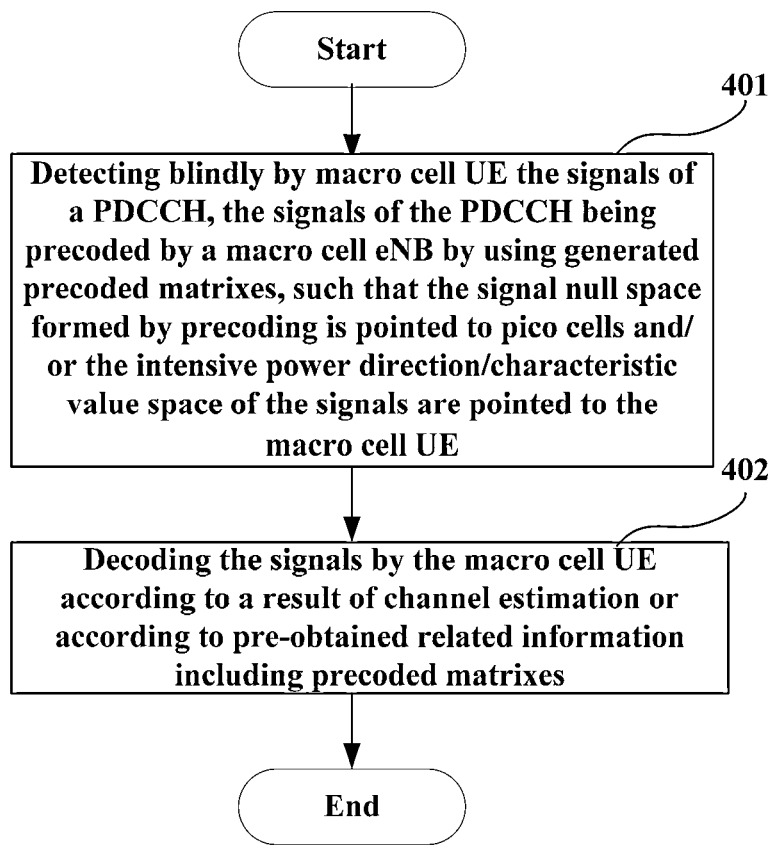
FIG. 4 is a flowchart of the method of interference coordination of embodiment 3 of the present invention.

An embodiment of the present invention provides a method of interference coordination. As shown in FIG. 4, the method comprises:

step 401: detecting by macro cell UE the signals of a downlink control channel, the signals of the downlink control channel being precoded by a macro cell eNB, such that the signal null space formed by precoding is pointed to pico cells and/or the intensive power direction or characteristic value space of the signals are pointed to the macro cell UE;

wherein, the macro cell UE performs blind detection on the signals of the PDCCH in each subframe;

step 402: decoding the signals by the macro cell UE according to a result of channel estimation or according to pre-obtained related information including precoded matrixes.

In this embodiment, besides the precoded matrixes, the related information may further comprise other information, as described in embodiments 1 and 2, which shall not be described any further.

In this embodiment, in some cases, the UE is not needed to learn the above related information and to use the above related information for performing corresponding precoding, as described in Embodiment 1, which shall not be described any further. In such cases, in step 402, the macro cell UE may perform multi-antenna decoding according to the result of channel estimation.

Furthermore, in cases where the related information needs to be used, the macro cell UE may decode the signals of the PDCCH according to the related information.

In this embodiment, following step may be included after step 402:

performing descrambling, demodulation, channel decoding and CRC check on the decoded signals by the macro cell UE, so as to finally obtain corresponding information; wherein any existing manner may be used for processing, which shall not be described herein any further.

It can be seen from the above embodiment that the macro cell UE may correctly process the detected signals of the PDCCH according to the related information configured by the macro cell eNB.

In this embodiment, following step may be included before the macro cell UE performs the blind detection: receiving the related information informed by the macro cell eNB and storing the related information. Wherein, the contents of the related information are as described in Embodiment 2, which shall not be described herein any further.

Therefore, if the relation information comprises the subframe information, as shown in Table 1, following step may be included before step 402: determining whether to decode the signals of the downlink control channel according to the matrixes configured by the macro cell eNB; wherein as shown in Table 1, if the macro cell UE determines that the current subframe is the subframe to which the precoding processing performed by the macro cell eNB by using the matrixes configured via high-layer signaling corresponds, the UE may determine to decode the signals of the PDCCH according to the matrixes configured by the macro cell eNB; otherwise, performing multi-antenna decoding on the signals of the PDCCH in the multi-antenna manner configured by the system.

Embodiment 4

Figure 5:
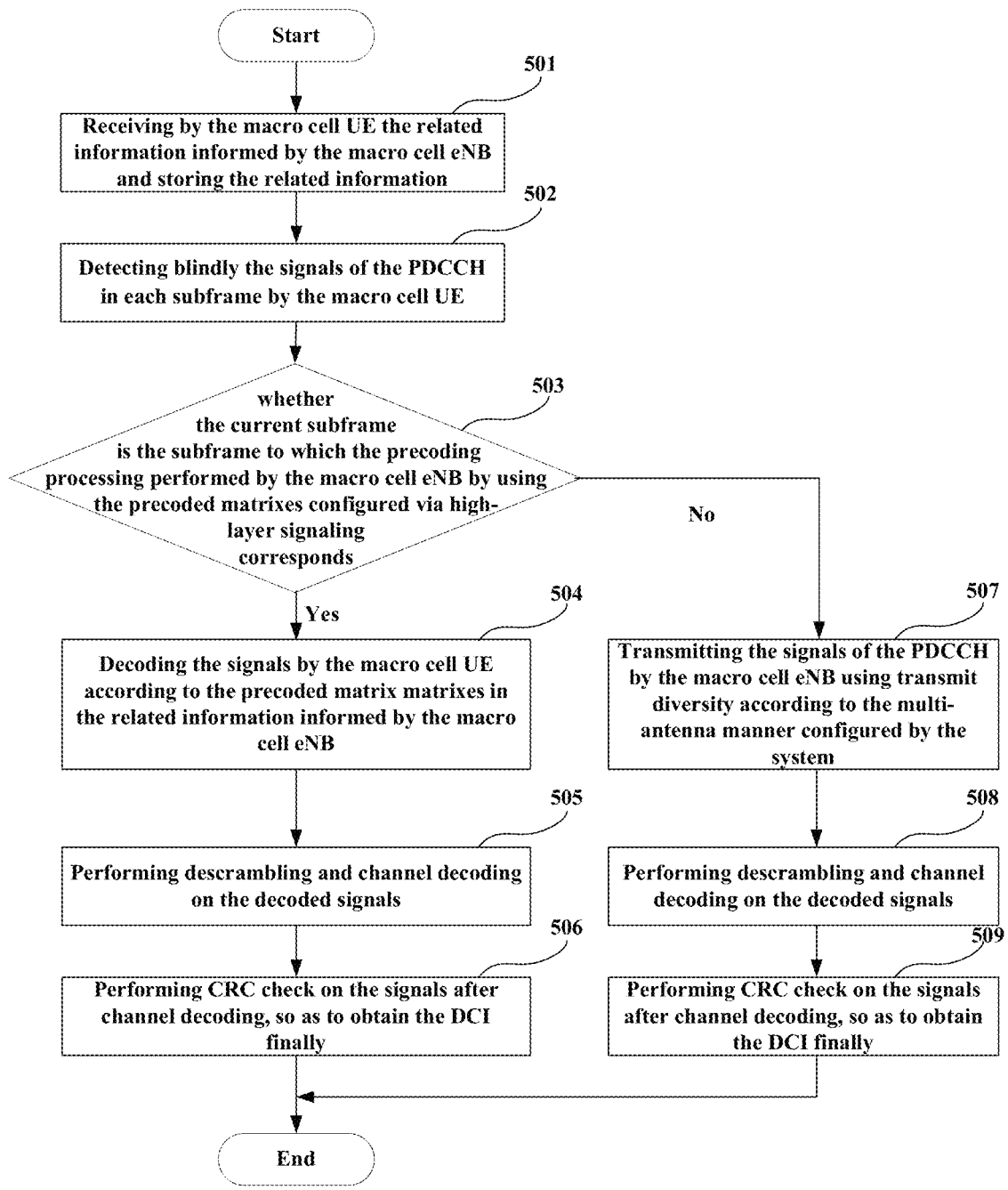
FIG. 5 is a flowchart of the method of interference coordination of embodiment 4 of the present invention.

The procedure of receiving PDCCHs by the macro cell UE shall be described below with reference to FIG. 5 and the information in tables 1 and 2. Wherein, the description is given taking that the UE needs to use the related information configured by the macro cell eNB as an example.

An embodiment of the present invention provides a method of interference coordination. As shown in FIG. 5, the method comprises:

step 501: receiving by the macro cell UE the related information informed by the macro cell eNB and storing the related information;

wherein the process of configuration of the related information is as described in embodiments 1 and 2, which shall not be described herein any further, for example, the information shown in tables 1-5 may be configured;

step 502: detecting blindly the signals of the PDCCH in each subframe by the macro cell UE;

step 503: judging whether the current subframe is the subframe to which the precoding processing performed by the macro cell eNB by using the precoded matrixes configured via high-layer signaling corresponds; and executing step 504 if the result of judgment is positive; otherwise, executing step 507;

step 504: decoding the signals by the macro cell UE according to the precoded matrix matrixes in the related information informed by the macro cell eNB;

step 505: performing descrambling and channel decoding on the decoded signals;

step 506: performing CRC check on the signals after channel decoding, so as to obtain the DCI finally;

step 507: performing multi-antenna decoding by the macro cell eNB on the signals of the PDCCH in the multi-antenna manner configured by the system if the result of judgment in step 503 is negative;

steps 508-509: performing descrambling and channel decoding on the decoded signals, and performing CRC check on the signals after channel decoding, so as to obtain the DCI finally.

In this embodiment, the processes of steps 508-509 are similar to those of steps 505-506, and any existing manner may be used for processing, which shall not be described any further.

It can be seen from the above embodiment that the macro cell eNB may configure the related information needed by the macro cell eNB in precoding, via high-layer signaling, such as RRC signaling, and inform the macro cell UE of the related information. In this way, the macro cell eNB may precode the signals of the PDCCH of scheduled macro cell UE by using the related information, such that the signal null space formed by precoding is pointed to the pico cells and/or the intensive power direction or characteristic value space of the signals are pointed to the macro cell UE, thereby making the macro cell UE to correctly process the detected signals of the PDCCH according to the configured related information.

Embodiments of the present invention further provide a macro cell eNB and UE, as described in embodiments 4, 5 and 6. As the principles of the macro cell eNB and UE for solving problems are similar to those of the above methods of interference coordination based on a macro cell eNB and UE of embodiments 1-3, the implementation of the methods may be referred to for the implementation of the macro cell eNB and UE, and the repeated parts shall not be described any further.

Embodiment 5

Figure 6:
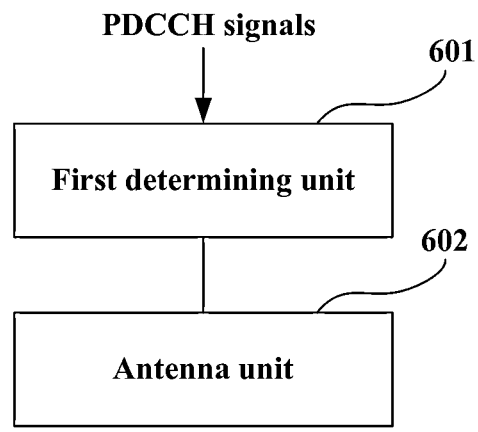
FIG. 6 is a schematic structural diagram of the macro cell eNB of embodiment 5 of the present invention.

An embodiment of the present invention provides a macro cell eNB. As shown in FIG. 6, the eNB comprises a first signal processing unit 601 and an antenna unit 602; wherein, the first signal processing unit 601 is configured to precode the signals of the downlink control channel of scheduled macro cell UE by using pre-obtained precoded matrixes; and the antenna unit 602 is configured to transmit signals being precoded, such that the signal null space formed by precoding is pointed to pico cells and/or the intensive power direction/characteristic value space of the signals are pointed to the macro cell UE.

Wherein the antenna unit 602 may be an adaptive antenna array with strong correlation, and may also be a polarization antenna with weak correlation, etc.

It can be seen from the above embodiment that the macro cell eNB may precode the signals of the PDCCH of scheduled macro cell UE by using the precoded matrixes, such that the signal null space formed by precoding is pointed to the pico cells and/or the intensive power direction/characteristic value space of the signals are pointed to the macro cell UE, thereby eliminating the interference of the macro cell eNB on the pico cells, without affecting the performance of the macro cell, and improving the receiving performance of the macro cell UE.

Furthermore, the macro cell eNB may comprise a control information generating unit (not shown) configured to generate signals of the downlink control channel of the scheduled macro cell UE; wherein the process of generating the signals of the PDCCH is similar to that in step 304 of Embodiment 2, which shall not be described herein any further. And the first signal processing unit 601 may precode the signals of the PDCCH generated by the control information generating unit, i.e. multiplying the signals of the PDCCH by the precoded matrixes, and then transmit the signals via the antenna unit 602, such that the signal null space formed by precoding is pointed to the pico cells and/or the intensive power direction or characteristic value space of the signals are pointed to the macro cell UE.

It can be seen from the above embodiment that by the above precoding and by making the signal null space to be pointed to the pico cells, the interference of the PDCCH of the macro cell on the pico cells may be avoided, or even eliminated, without affecting the performance of the macro cell, and solving the problem existed in the prior art. Furthermore, by the above precoding and by making the intensive power direction of the signals to be pointed to the macro cell UE, the receiving performance of the macro cell UE may be further improved, and the interference of the macro cell eNB on the pico cells may further be alleviated.

Embodiment 6

On the basis of Embodiment 5, in the embodiment of the present invention, the macro cell eNB may further generate precoded matrixes, and may further configure related information comprising subframe information, for use by the macro cell eNB; and in the case where being needed by the UE, the related information may be together informed to the macro cell UE via high-layer signaling, such as RRC signaling. In this way, the macro cell eNB may use the related information to precode the signals of the PDCCH of the scheduled macro cell UE, and the macro cell UE may also use the related information to correctly decode the precoded signals of the PDCCH.

Figure 7:
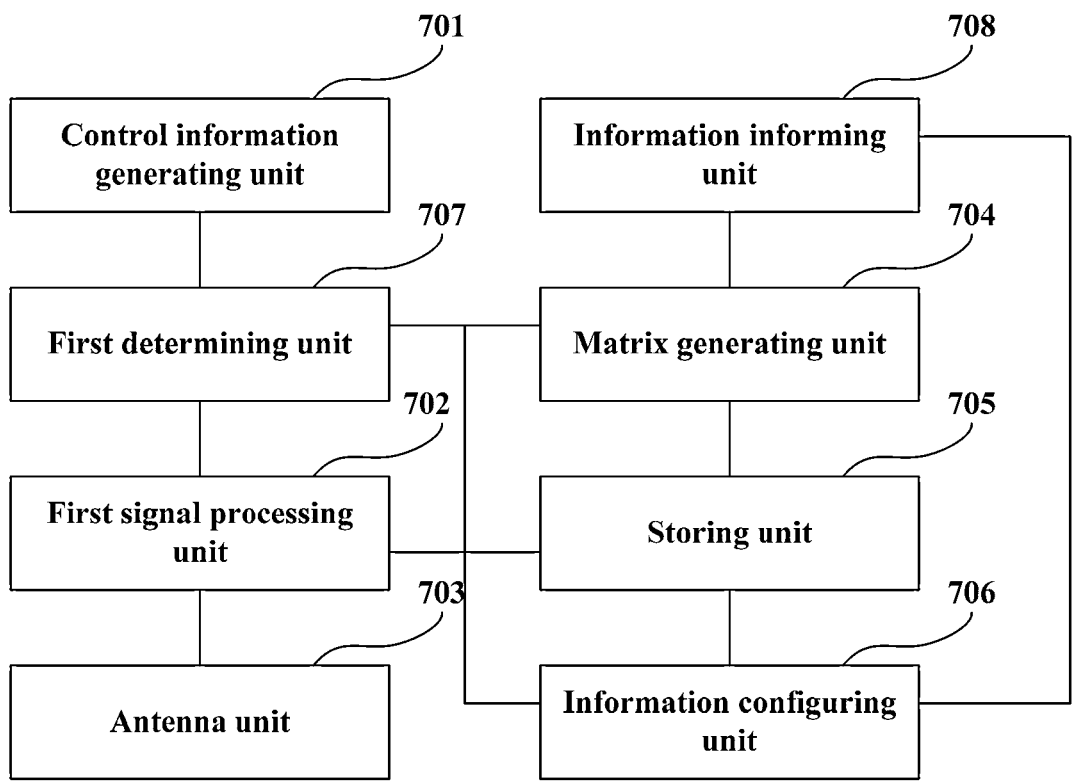
FIG. 7 is a schematic structural diagram of the macro cell eNB of embodiment 6 of the present invention.

Therefore, in this embodiment, as shown in FIG. 7, the macro cell eNB comprises a control information generating unit 701, a first signal processing unit 702 and an antenna unit 703, with the functions being similar to those in Embodiment 4, which shall not be described herein any further.

Furthermore, it may comprise a matrix generating unit 704 and a storing unit 705; wherein, the matrix generating unit 704 is configured to generate the precoded matrixes according to the channel information of the pico cells or according to the channel information of the pico cells and the channel information of the macro cell UE; and wherein the process of generation is as described in Embodiment 1.

The storing unit 705 is configured to store the matrix element information of the precoded matrixes, or correspondingly storing the matrix element of the precoded matrixes and matrix indices.

Furthermore, the macro cell eNB may configure subframe information indicating whether the macro cell UE is precoded so that the signal null space formed by precoding is pointed to the pico cells and/or the intensive power direction or characteristic value space of the signals are pointed to the macro cell UE. Therefore, the macro cell eNB may further comprise an information configuring unit 706 and a first determining unit 707; wherein, the information configuring unit 706 is configured to configure sub-frame information indicative of whether to precode the macro cell UE, such that the signal null space formed by precoding is pointed to pico cells and/or the intensive power direction/characteristic value space of the signal are pointed to the macro cell UE;

and the first determining unit 707 is configured to determine, according to the sub-frame information and before the first signal processing unit 702 precodes the signals of the downlink control channel of scheduled macro cell UE, whether the current subframe is the subframe that obtained by precoding the signals of the downlink control channel, such that the signal null space formed by precoding is pointed to pico cells and/or the intensive power direction or characteristic value space of the signals are pointed to the macro cell UE;

and the first signal processing unit 702 is configured to determine, if the determining result of the first determining unit 707 is positive, to precode the signals of the downlink control channel of the scheduled macro cell UE, such that the signal null space formed by precoding is pointed to the pico cells and/or the intensive power direction or characteristic value space of the signals are pointed to the macro cell UE.

Besides the above subframe information, other information may further be configured as described in embodiments 1-4, which shall not be described herein any further.

In this embodiment, if needed, i.e. in the case as described in Embodiment 1, the macro cell eNB may further inform the macro cell UE of the configured above information and the generated precoded matrixes via high-layer signaling; however, it is not limited to the high-layer signaling, and other signaling may also be employed.

As shown in FIG. 7, the macro cell eNB may further comprise an information informing unit 708 configured to inform the related information to the macro cell UE; and in such a case, the first signal processing unit 702 uses the related information to precode the signals generated by the control information generating unit 701.

In the above embodiment, the principle of the macro cell eNB for solving problems is similar to those in embodiments 1 and 2, which shall not be described herein any further.

Embodiment 7

Figure 8:
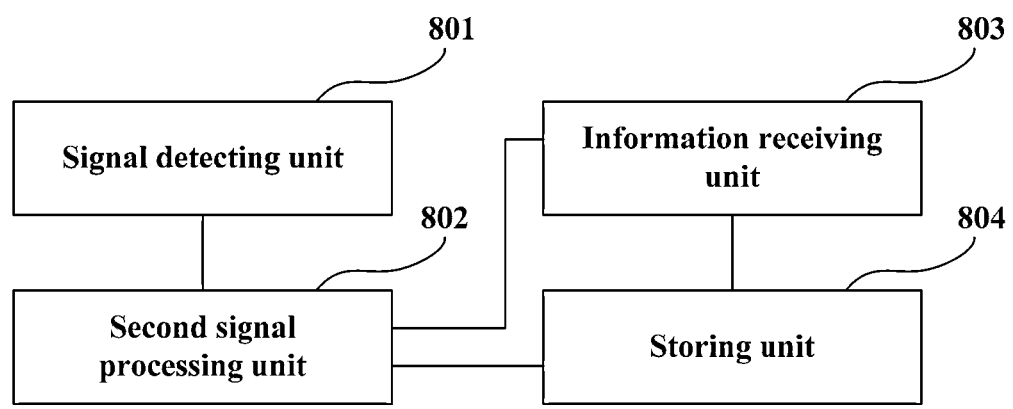
FIG. 8 is a schematic structural diagram of the user equipment of embodiment 7 of the present invention.

An embodiment of the present invention provides UE. As shown in FIG. 8, the UE comprises:

a signal detecting unit 801 configured to detect the signals of a downlink control channel, the signals of the downlink control channel being precoded by a macro cell eNB, such that the signal null space formed by precoding is pointed to pico cells and/or the intensive power direction or characteristic value space of the signals are pointed to the macro cell UE; and a second signal processing unit 802 configured to decode the signals detected by the signal detecting unit according to a result of channel estimation or according to pre-obtained related information including precoded matrixes.

Furthermore, a signal processing unit (not shown) may be included, which is configured to perform corresponding processing on the decoded signals, i.e. descrambling, signal decoding and CRC check, so as to obtain DCI finally.

In this embodiment, the macro cell eNB may further decide whether to inform the related information such as the generated precoded matrixes or the precoded matrixes and the configured above subframe information to the macro cell UE according to the manner of demodulating the PDCCH by the macro cell UE.

For example, for a PDCCH demodulated based on a demodulation reference signal (DM-RS), the macro cell eNB needs not to inform the macro cell UE of the related information containing some of the above information on precoded matrixes, subframes and PDCCH transmission power. And such information is only used at the macro cell UE side. In such a case, no matter whether the macro cell eNB precodes the signals of the PDCCH, the macro cell UE performs blind detection on the PDCCH, that is, performing multi-antenna decoding according to a result of channel estimation.

Besides the above case, the macro cell eNB may further inform the macro cell UE of the above related information. In such a case, when the macro cell eNB precodes the signals of the PDCCH, such that the signal null space formed by the precoding is pointed to pico cells and/or the intensive power direction or characteristic value space of the signals are pointed to the macro cell UE, and when the macro cell UE detects the signals of the PDCCH, the macro cell UE may decode the signals of the PDCCH according to the obtained related information.

In this embodiment, if it is needed to inform the macro cell UE of the above related information, the macro cell eNB may inform the macro cell UE of such related information as the generated precoded matrixes, or the configured subframe information respectively; furthermore, it may inform the macro cell UE of the above related information together via high-layer signaling, such as radio resource control (RRC) signaling, such that when the macro cell UE detects the signals of the PDCCH, the macro cell UE may correctly decode the signals of the PDCCH according to the obtained related information.

In the embodiment of the present invention, as shown in FIG. 8, the UE may further comprise an information receiving unit 803 configured to receive the related information informed by the macro cell eNB; wherein the contents of the related information are as described in Embodiment 2, which shall not be described herein any further.

Furthermore, the UE may comprise a storing unit 804 configured to store the received related information, for used by the second signal processing unit 802.

In this embodiment, if the related information contains the subframe information in Table 1 or Table 3, the second signal processing unit 802 is further needed to, before decoding the detected signals, judge whether to decode the detected signals as per the high-layer signaling configured by the macro cell eNB according to the current subframe and the subframe information; and the manner of judgment is as described above, which shall not be described herein any further. Hence, the UE may further comprise a second determining unit (not shown) configured to decode the detected the signals of the PDCCH as per the high-layer signaling configured by the macro cell eNB.

In the above embodiment, the principle of the UE for solving problems is similar to that in Embodiment 3, which shall not be described herein any further.

In this embodiment, the macro cell UE is not limited to a mobile phone, and may be any types of appropriate electronic devices, examples of which comprising all the devices transmitting data and receiving the feedback of the transmitted data, such as a media player, a game device, a desk-top or lap-top computer, a pager, a communicator, a personal digital assistant (PDA), and a smart telephone, etc.

With the embodiment above, the macro cell eNB may configure the related information needed by the macro cell eNB in precoding via high-layer signaling, such as RRC signaling, and informs the related information to the macro cell UE. In this way, the macro cell eNB may use the related information to precode the signals of the PDCCH of the scheduled macro cell UE, such that the signal null space formed by the precoding is pointed to the pico cells, thereby avoiding, or even eliminating the interference of the PDCCH of the macro cell on the pico cells, and/or the characteristic value space of the signals is pointed to the macro cell UE, thereby not only improving the receiving performance of the UE, but also performing interference coordination, and making the macro cell UE to correctly process the detected signals of the PDCCH according to the related information configured by the macro cell eNB.

An embodiment of the present invention further provides a computer-readable program, wherein when the program is executed in a macro cell eNB, the program enables the computer to carry out the method of interference coordination as described in Embodiment 1 or 2 in the macro cell eNB.

An embodiment of the present invention further provides a storage medium in which a computer-readable program is stored, wherein the computer-readable program enables the computer to carry out the method of interference coordination as described in Embodiment 1 or 2 in a macro cell eNB.

An embodiment of the present invention further provides a computer-readable program, wherein when the program is executed in UE, the program enables the computer to carry out the method of interference coordination as described in Embodiment 3 or 4 in the UE.

An embodiment of the present invention further provides a storage medium in which a computer-readable program is stored, wherein the computer-readable program enables the computer to carry out the method of interference coordination as described in Embodiment 3 or 4 in UE.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

The invention claimed is:

1. A method of interference coordination, comprising:
determining, by a Macro base station, according to pre-configured sub-frame information, whether a current sub-frame is a sub-frame that is used for precoding signals of a downlink control channel, such that a signal null space formed by precoding is pointed to pico cells and/or a high power direction/characteristic value space of the signals are pointed to macro cell user equipment; and
precoding, when a result of determining is positive, the signals of the downlink control channel of scheduled macro cell user equipment by using pre-obtained pre-coded matrixes, such that the signal null space formed by precoding is pointed to pico cells and/or the high power direction/characteristic value space of the signals is pointed to the macro cell user equipment.

2. The method according to claim 1, wherein before the Macro base station precodes the signals of the downlink control channel of the scheduled macro cell UE, the method further comprises:
generating by the Macro base station the precoded matrixes according to channel information of the pico cells or according to channel information of the pico cells and channel information of the macro cell user equipment; and
storing matrix element information of the precoded matrixes, or correspondingly storing a matrix element of the precoded matrixes and matrix indices.

3. The method according to claim 2, wherein the method further comprises:
informing the matrix element information of the precoded matrixes or the matrix indices to corresponding macro cell user equipment.

4. The method according to claim 1, wherein the method further comprises:
configuring the sub-frame information indicative of whether to precode the macro cell user equipment, such that the signal null space formed by precoding is pointed to pico cells and/or the high power direction/characteristic value space of the signals are pointed to the macro cell user equipment.

5. The method according to claim 4, further comprising informing the pre-configured sub-frame information to corresponding macro cell user equipment.

6. The method according to claim 1, wherein at least one of the precoded matrixes of the macro cell user equipment is different from the precoded matrixes of other macro cell user equipment; or
for the same macro cell user equipment, it corresponds to different precoded matrixes in different cases; or
at least one of the precoded matrixes corresponding to a sub-frame is different from the precoded matrixes corresponding to other sub-frames.

7. A method of interference coordination, comprising:
detecting by macro cell user equipment signals of a downlink control channel, the signals of the downlink control channel being precoded by a Macro base station, such that a signal null space formed by precoding is pointed to pico cells and/or a high power direction/characteristic value space of the signals are pointed to the macro cell user equipment; and
decoding the signals by the macro cell user equipment according to a result of channel estimation or according to pre-obtained related information including precoded matrixes;
wherein the related information further comprises pre-configured sub-frame information indicative of whether to precode the macro cell user equipment, such that the signal null space formed by precodinq is pointed to pico cells and/or the high power direction/characteristic value space of the signal are pointed to the macro cell user equipment.

8. The method according to claim 7, wherein the method further comprises:
receiving the related information informed by the Macro base station.

9. The method according to claim 7, wherein before decoding the signals according to pre-obtained related information including precoded matrixes, the method further comprises:
determining, according to preconfigured sub-frame information, whether to decode the signals of the downlink control channel according to the related information.

10. A Macro base station, comprising:
a first determining unit to determine, according to pre-configured sub-frame information, whether a current sub-frame is a sub-frame that is used for precoding signals of a downlink control channel, such that a signal null space formed by precoding is pointed to pico cells and/or a high power direction/characteristic value space of the signals are pointed to macro cell user equipment;
a first signal processing unit to precode the signals of the downlink control channel of scheduled macro cell user equipment by using pre-obtained precoded matrixes when a determining result of the first determining unit is positive, such that the signal null space formed by precoding is pointed to the pico cells and/or the high power direction/characteristic value space of the signals are pointed to the macro cell user equipment; and
an antenna unit to transmit signals being precoded, such that the signal null space formed by the antenna unit is pointed to pico cells and/or the high power direction/characteristic value space of the signals are pointed to the macro cell user equipment.

11. The Macro base station according to claim 10, wherein the macro base station further comprises:
a matrix generating unit to generate the precoded matrixes according to channel information of the pico cells or according to channel information of the pico cells and channel information of the macro cell user equipment; and
a storing unit to store matrix element information of the precoded matrixes, or correspondingly storing a matrix element of the precoded matrixes and matrix indices.

12. The Macro base station according to claim 10, wherein the macro base station further comprises:
an information configuring unit to configure the sub-frame information indicative of whether to precode the macro cell user equipment, such that the signal null space formed by precoding is pointed to pico cells and/or the high power direction/characteristic value space of the signal are pointed to the macro cell user equipment.

13. The Macro base station according to claim 10, wherein at least one of the precoded matrixes of the macro cell user equipment is different from the precoded matrixes of other macro cell user equipment; or for the same macro cell user equipment, it corresponds to different precoded matrixes in different cases; or at least one of the precoded matrixes corresponding to a sub-frame is different from the precoded matrixes corresponding to other sub-frames.

14. A user equipment, comprising:
a signal detecting unit to detect signals of a downlink control channel, the signals of the downlink control channel being precoded by a macro base station, such that a signal null space formed by precoding is pointed to pico cells and/or a high power direction/characteristic value space of the signals are pointed to a macro cell user equipment; and
a second signal processing unit to decode the signals detected by the signal detecting unit according to a result of channel estimation or according to pre-obtained related information including precoded matrixes;
wherein the related information further comprises pre-configured sub-frame information indicative of whether to precode the macro cell user equipment, such that the signal null space formed by precoding is pointed to pico cells and/or the high power direction/characteristic value space of the signal are pointed to the macro cell user equipment.

15. The user equipment according claim 14, wherein the user equipment further comprises:

a second determining unit to determine, according to the pre-configured sub-frame information, whether to decode the signals of the downlink control channel according to the related information.

* * * * *